(12) United States Patent
Hsu et al.

(10) Patent No.: US 7,346,128 B2
(45) Date of Patent: Mar. 18, 2008

(54) DUAL-MODE RECEIVER AND RECEIVING METHOD THEREOF

(75) Inventors: Chun-Ming Hsu, Taipei (TW); Wei-Yang Ou, Kaohsiung (TW); Chih-Hong Lou, Ilan (TW); Tzu-Yi Yang, Dali (TW)

(73) Assignee: Industrial Technology Research Institute, Hsinchu (TW)

( * ) Notice: Subject to any disclaimer, the term of this patent is extended or adjusted under 35 U.S.C. 154(b) by 634 days.

(21) Appl. No.: 10/648,247

(22) Filed: Aug. 27, 2003

(65) Prior Publication Data

US 2004/0058661 A1 Mar. 25, 2004

(30) Foreign Application Priority Data

Sep. 23, 2002 (TW) ............................. 91121728 A

(51) Int. Cl.
*H03K 9/00* (2006.01)

(52) U.S. Cl. .................................................. 375/316

(58) Field of Classification Search ................ 375/316, 375/323, 324, 328, 329, 337, 349, 340
See application file for complete search history.

(56) References Cited

U.S. PATENT DOCUMENTS

| 5,291,516 A | 3/1994 | Dixon et al. |
| 5,668,837 A * | 9/1997 | Dent ........................... 375/316 |
| 6,029,052 A | 2/2000 | Isberg et al. |
| 6,094,564 A * | 7/2000 | Tomiya et al. .................. 455/73 |
| 6,160,859 A | 12/2000 | Martin et al. |
| 6,169,733 B1 | 1/2001 | Lee |
| 6,389,059 B1 * | 5/2002 | Smith et al. ................. 375/141 |
| 6,694,131 B1 * | 2/2004 | Lakkis ........................ 455/302 |
| 6,775,530 B2 * | 8/2004 | Severson et al. ............ 455/324 |
| 6,999,716 B1 * | 2/2006 | Andre et al. ................ 455/3.02 |
| 7,099,688 B2 * | 8/2006 | Wilson ..................... 455/552.1 |
| 2001/0014594 A1 * | 8/2001 | Khlat et al. .................. 455/303 |
| 2002/0150174 A1 * | 10/2002 | Spiegel et al. .............. 375/316 |
| 2002/0173337 A1 * | 11/2002 | Hajimiri et al. ............. 455/552 |
| 2003/0072393 A1 * | 4/2003 | Gu ............................. 375/322 |
| 2004/0038649 A1 * | 2/2004 | Lin et al. ..................... 455/130 |
| 2004/0069852 A1 * | 4/2004 | Seppinen et al. ........... 235/451 |
| 2004/0121753 A1 * | 6/2004 | Sugar et al. ................. 455/333 |
| 2005/0191978 A1 * | 9/2005 | Spencer et al. ............. 455/132 |
| 2006/0189290 A1 * | 8/2006 | Olson ......................... 455/285 |

OTHER PUBLICATIONS

Crols et al., IEEE Transactins on Circuits and Systems-II: Analog and Digital Signal Processing, vol. 45, No. 3, pp. 269-282 (Mar. 1998).

* cited by examiner

*Primary Examiner*—Emmanuel Bayard
(74) *Attorney, Agent, or Firm*—Birch, Stewart, Kolasch & Birch, LLP

(57) ABSTRACT

A receiving method for dual-mode receiver. When a received communication signal is a wideband signal, the dual-mode receiver is configured as a direct-conversion receiver, and when a received communication signal is a narrowband signal, the dual-mode receiver is configured as a low-IF receiver.

14 Claims, 9 Drawing Sheets

DUAL-MODE RECEIVER AND RECEIVING METHOD THEREOF

This nonprovisional application claims priority under 35 U.S.C. § 119(a) on Patent Application No(s). 091121728 filed in TAIWAN on Sep. 23, 2002, which is (are) herein incorporated by reference.

BACKGROUND OF THE INVENTION

1. Field of the Invention

The invention relates to a dual-mode receiver, and more particularly to a receiver for a wideband system and a narrowband system, which combines a direct-conversion mode and a low-IF mode and can alternate therebetween.

2. Description of the Related Art

Multi-mode receivers have been proposed during the past few years. Multi-mode receivers can handle two or more communication standards, such as a mobile phone supporting a 3G standard (such as WCDMA) and a 2G standard (such as GSM). Because of various specifications of communication systems, channel bandwidths are different, such as the bandwidths of the WCDMA system and the GSM system being respectively 5 MHz and 200 kHz.

Two structures for highly integrated receivers are low-IF receiver and direct-conversion receiver. The low-IF receiver can avoid the problems of DC offset and low frequency noise, but may interfere with image signals. On the contrary, the direct-conversion receiver can avoid image signals, but may be influenced by the DC offset and low frequency noise. Narrowband signals received by direct-conversion receivers are usually influenced by the DC offset and low frequency noise. Therefore, it is easier to receive narrowband signals with high quality by low-IF receivers. Wideband signals received by direct-conversion receivers are rarely influenced by the DC offset and low frequency noise. Therefore, using direct-conversion receivers to receive the wideband signals can decrease power consumption and the bandwidth for processing analog baseband signals.

At present, RF transceivers often use BiCMOS elements. CMOS elements are another choice for making RF transceivers. An advantage is that CMOS RF transceivers are easy to integrate with CMOS digital circuits to realize system-on-chip (SOC). Flicker noise on the CMOS element is more, however, than on the BJT element, such that it is much more difficult to make a direct-conversion receiver for a narrow system with COMS elements.

FIG. 1 is a diagram illustrating the conventional configuration of the direct-conversion receiver. A signal $S_I$ is received by an antenna 102. The frequency of the carrier of the signal $S_I$ is $f_c$. After passing a bandpass filter 104, the signal $S_I$ is amplified by a low noise amplifier 106. The quadrature mixer 108 converts the amplified signal down to a pair of baseband signals. The baseband signals are respectively an I-channel signal $S_{ID}$ and a Q-channel signal $S_{QD}$. A mixer 128a of the quadrature mixer 108 receives a sine signal whose frequency is $f_c$ and whose phase is 0° from a local oscillator 109. A mixer 128b of the quadrature mixer 108 receives a sine signal whose frequency is $f_c$ and whose phase is 90° from the local oscillator 109.

After passing DC offset cancellation units 110a and 110b, the I-channel signal $S_{ID}$ and the Q-channel signal $S_{QD}$ are respectively input to lowpass filter 112a and 112b. Then, the filter signals are respectively input to programmable gain amplifiers 114a and 114b to generate an I-channel signal $S_{IO}$ and a Q-channel signal $S_{QO}$ output. The output signals are usually input to a digital signal processor (not shown in FIG. 1). The direct-conversion receiver can avoid image signals, but may be influenced by the DC offset and low frequency noise. If the direct-conversion receiver is used in a narrowband system such as a GSM system, the DC offset will overlap the downconverted signal and the signal-to-noise ratio will be decreased. Although a GSM product using a direct-conversion receiver is available (referring to HD155141TF, Hitachi), the product requires extra current for complex analog signal processing technology to cancel DC offset. On the contrary, wideband signals such as WCDMA signals are rarely influenced by the DC offset and low frequency noise. The bandwidth of the analog baseband circuits in the low-IF receiver is two or more times that of the direct-conversion receiver. Therefore, using direct-conversion receivers to receive the wideband signals can decrease power consumption and required bandwidth for processing analog baseband signals.

FIG. 2 is a diagram illustrating the conventional configuration of the low-IF receiver. The elements of the low-IF receiver and of the direct-conversion receiver with the same function have the same labels. The major difference between the low-IF receiver and the direct-conversion conversion receiver is that the quadrature mixer 208 converts the amplified signal down to a pair of intermediate frequency signals with the carrier whose frequency is $f_{IF}$ ($f_{IF}$ is usually half the channel bandwidth but is not limited thereto). The secondary downconverter converts the intermediate frequency signals to a pair of baseband signals $S_{IO}$ and $S_{QO}$ output. A mixer 228a of the quadrature mixer 208 receives a sine signal whose frequency is $f_c$-$f_{IF}$ and whose phase is 0° from a local oscillator 209. A mixer 228b of the quadrature mixer 208 receives a sine signal whose frequency is $f_c$-$f_{IF}$ and whose phase is 90° from the local oscillator 209. Furthermore, image rejection units 211a and 211b are added in the low-IF receiver to cancel image rejection. Although DC offset in the low-IF receiver must be canceled, it is not as important as in the direct-conversion receiver. The bottleneck of the low-IF receiver is that the canceled amount of the image rejection depends on the matched level of the elements in the low-IF receiver chip. At present, the maximum amount is around 30 dB. Therefore, for systems whose adjacent channel has high power such as WCDMA system, the difficulty for using low-IF receivers is significantly increased.

Accordingly, the low-IF receiver and the direct-conversion receiver each have their own advantages. Using the low-IF receiver to receive narrowband signal can avoid the problems of DC offset and low frequency noise. Using the direct-conversion receiver to receive the wideband signals can decrease power consumption and the bandwidth for processing analog baseband signals.

SUMMARY OF THE INVENTION

An object of the present invention is to provide a dual-mode receiver to receive both narrowband signals and wideband signals with high quality and satisfy the requirement for various systems whose adjacent channels have varying power. The receiver combines a direct-conversion mode and a low-IF mode. Common elements between the two modes in the receiver are shared. Thus, the hardware cost and the superficial measure of the chip comprising the dual-mode receiver are significantly decreased. The invention implemented by the CMOS process may decrease the manufacture cost.

Accordingly, the present invention provides a receiving method for a dual-mode receiver. The method is characterized in that when a received communication signal is a wideband signal, the dual-mode receiver is configured as a direct-conversion receiver, and when a received communication signal is a narrowband signal, the dual-mode receiver is configured as a low-IF receiver Furthermore, the present invention also provides a dual-mode receiver. An antenna, a low noise amplifier, a quadrature mixer, a pair of DC offset cancellation units, a pair of lowpass filters and a pair of programmable gain amplifiers are shared in a direct-conversion mode and a low-IF mode. A pair of image rejection units and a pair of the downconverters are only used in the low-IF mode.

The antenna receives an input signal with a carrier from a transmitting channel. The low noise amplifier is coupled to the antenna. The quadrature mixer is coupled to the low noise amplifier, for receiving an amplified signal. When the dual-mode receiver operates in the direct-conversion mode, the quadrature mixer converts the amplified signal down to a pair of baseband signals. When the dual-mode receiver operates in the low-IF mode, the quadrature mixer converts the amplified signal down to a pair of intermediate frequency signals.

Each DC offset cancellation unit receives one of the signals output from the quadrature mixer. The image rejection units are coupled to the DC offset cancellation units respectively when the dual-mode receiver operates in the low-IF mode. The lowpass filters are coupled to the DC offset cancellation units or the image rejection units. The programmable gain amplifiers are coupled to the lowpass filters respectively. The downconverters coupled to the programmable gain amplifiers respectively convert amplified signals to baseband signals output when the dual-mode receiver operates in the low-IF mode.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention, will become better understood from the detailed description given hereinbelow and the accompanying drawings, which are given by way of illustration only, and thus are not limitative of the present invention, and in which.

DETAILED DESCRIPTION OF THE INVENTION

The invention discloses a dual-mode receiver which combines the advantages of the direct-conversion receiver and the low-IF receiver. The receiver can alternate between a direct-conversion mode and a low-IF mode. When the receiver enters the direct-conversion mode, it can receive wideband signals. When the receiver enters the low-IF mode, it can receive narrowband signals. The following embodiments are described in detail with reference to the figures.

Figure 3A:
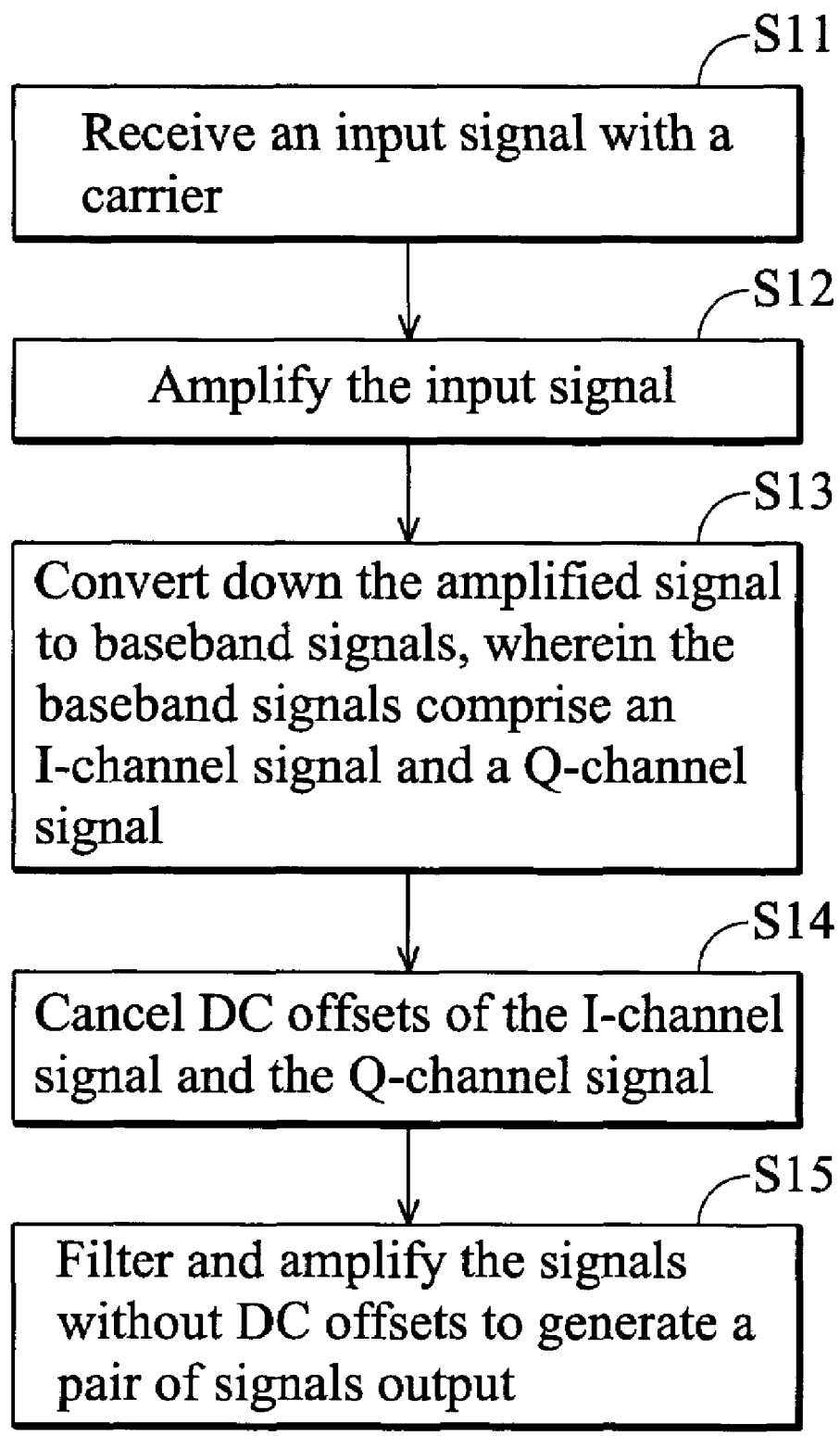
FIG. 3a is a flowchart illustrating the procedures for receiving communication signals in the direct-conversion mode according to the receiving method of the present invention.

The present invention provides a receiving method for a dual-mode receiver. The method is characterized in that when a received communication signal is a wideband signal, the dual-mode receiver is configured as a direct-conversion receiver, and when a received communication signal is a narrowband signal, the dual-mode receiver is configured as a low-IF receiver. FIG. 3a is a flowchart illustrating the procedures for receiving communication signals in the direct-conversion mode according to the receiving method of the present invention. First, an input signal with a carrier is received (S11). Then, the input signal is amplified (S12). Next, the amplified signal is converted down to baseband signals (S13). The baseband signals comprise an I-channel signal and a Q-channel signal. After DC offsets of the I-channel signal and the Q-channel signal are canceled (S14), the signals without DC offsets are filtered and amplified to generate a pair of signals output (S15).

Figure 3B:
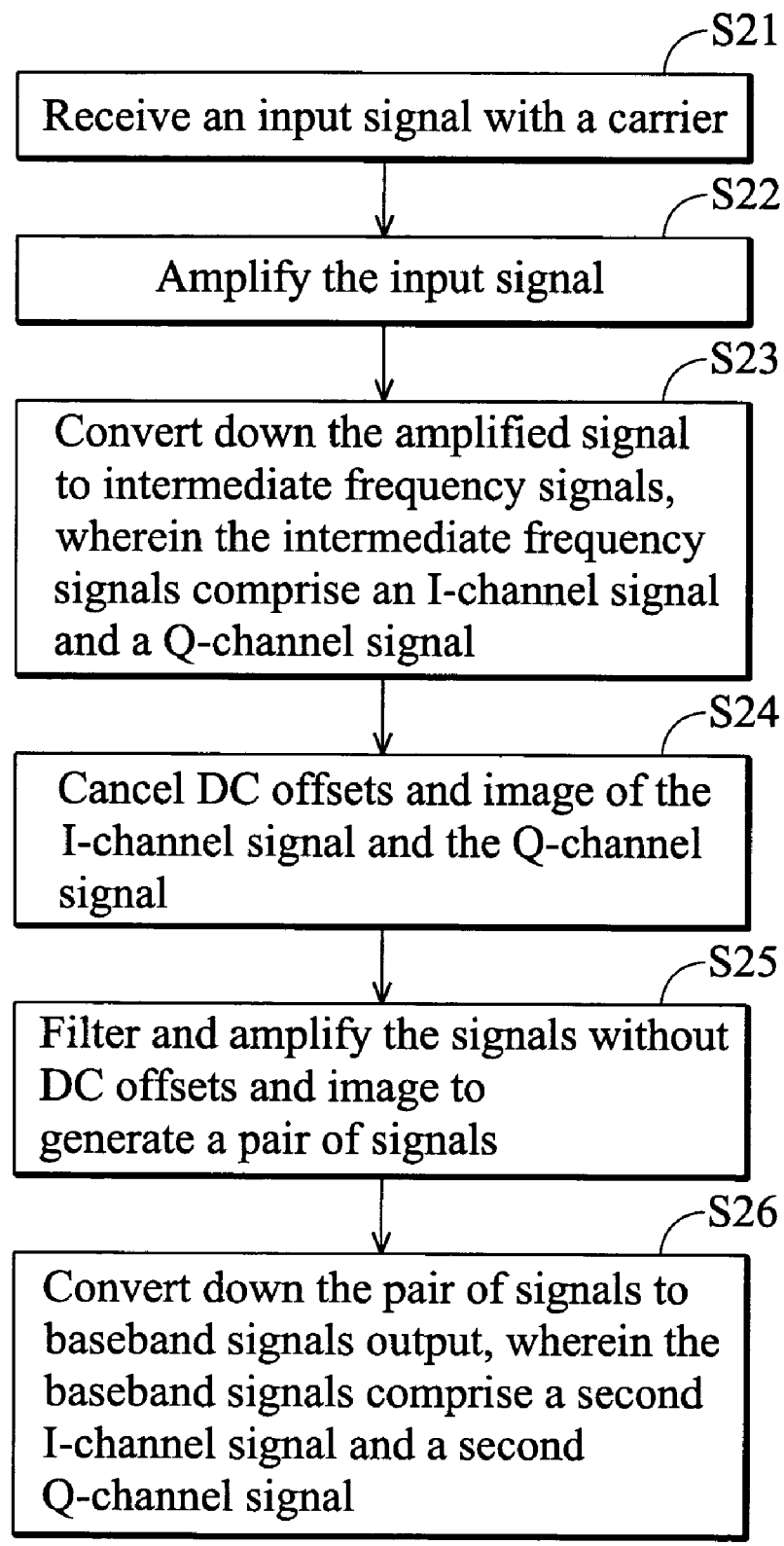
FIG. 3b is a flowchart illustrating the procedures for receiving communication signals in the low-IF mode according to the receiving method of the present invention.

FIG. 3b is a flowchart illustrating the procedures for receiving communication signals in the low-IF mode according to the receiving method of the present invention. First, an input signal with a carrier is received (S21). Then, the input signal is amplified (S22). Next, the amplified signal is converted down to intermediate frequency signals (S23). The intermediate frequency signals comprise an I-channel signal and a Q-channel signal. After DC offsets and image refection of the I-channel signal and the Q-channel signal are canceled (S24), the signals without DC offsets and image are filtered and amplified to generate a pair of signals (S25). Finally, the pair of signals are converted down to baseband signals output (S26). The baseband signals comprise a second I-channel signal and a second Q-channel signal.

Figure 3C:
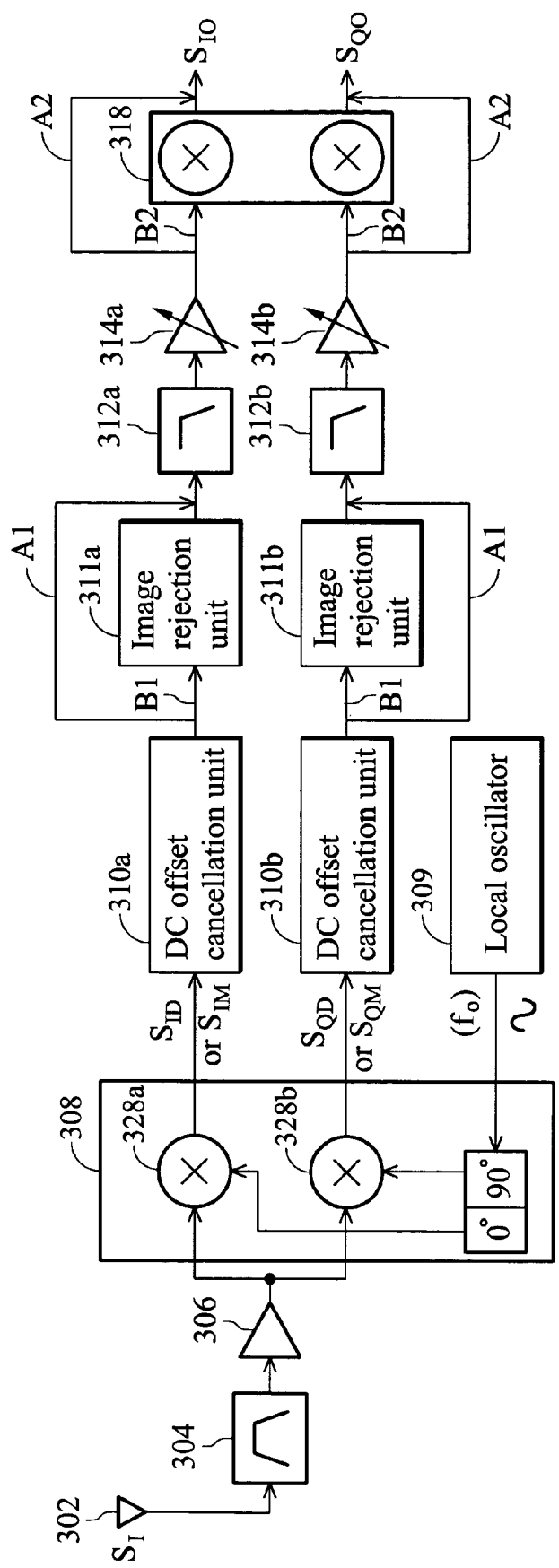
FIG. 3c is a diagram illustrating the configuration of the dual-mode receiver according to the receiving method of the present invention.

FIG. 3c is a diagram illustrating the configuration of the dual-mode receiver according to the receiving method of the present invention. A signal $S_I$ received by an antenna 302 through a bandpass filter 304 is a wideband signal such as WCDMA signal or a narrowband signal such as GSM signal. When the signal $S_I$ is the wideband signal, the signal $S_I$ is received by the direct-conversion mode. Paths B1 and B2 are disconnected. DC offset cancellation units 310a and 310b are respectively connected to lowpass filter 312a and 312b directly. A frequency of a sine signal input from a local oscillator 309 is $f_c$. When the signal $S_I$ is the narrowband signal, the signal $S_I$ is received by the low-IF mode. Paths A1 and A2 are disconnected. DC offset cancellation units 310a and 310b are respectively connected to lowpass filter 312a and 312b through image rejection units 311a and 311b. The frequency of the sine signal input from the local oscillator 309 is $f_c$-$f_{IF}$.

In the direct-conversion mode, the signal $S_I$ received by the antenna 302 is a wideband signal $S_{IW}$. The frequency of the carrier of the wideband signal $S_{IW}$ is $f_c$. After passing the bandpass filter 304, the wideband signal $S_{IW}$ is amplified by a low noise amplifier 306. A quadrature mixer 308 converts the amplified signal down to a pair of baseband signals. The baseband signals are respectively an I-channel signal $S_{ID}$ and a Q-channel signal $S_{QD}$. A mixer 328a of the quadrature mixer 308 receives a sine signal whose frequency is $f_c$ and whose phase is 0° from the local oscillator 309. A mixer 328b of the quadrature mixer 308 receives a sine signal whose frequency is $f_c$ and whose phase is 90° from the local oscillator 309.

After passing the DC offset cancellation units 310a and 310b, the I-channel signal $S_{ID}$ and the Q-channel signal $S_{QD}$ are respectively input to the lowpass filter 312a and 312b through the pass A1. Then, the filter signals are respectively input to programmable gain amplifiers 314a and 314b to generate an I-channel signal $S_{IO}$ and a Q-channel signal $S_{QO}$ through the pass A2 output. The output signals are usually input to a digital signal processor (not shown in FIG. 3c).

In the low-IF mode mode, the signal $S_I$ received by the antenna 302 is a narrowband signal $S_{IN}$. The frequency of the carrier of the narrowband signal $S_{IN}$ is $f_c$. After passing the bandpass filter 304, the narrowband signal $S_{IN}$ is amplified by the low noise amplifier 306. The quadrature mixer 308 converts the amplified signal down to a pair of intermediate frequency signals with the carrier whose frequency is $f_{IF}$ ($f_{IF}$ is usually half of the channel bandwidth but is not limited thereto). The intermediate frequency signals are respectively an I-channel signal $S_{Im}$ and a Q-channel signal $S_{Qm}$. The mixer 328a of the quadrature mixer 308 receives a sine signal whose frequency is $f_c$-$f_{IF}$ and whose phase is 0° from the local oscillator 309. The mixer 328b of the quadrature mixer 308 receives a sine signal whose frequency is $f_c$-$f_{IF}$ and whose phase is 90° from the local oscillator 309.

After passing the DC offset cancellation units 310a and 310b, the I-channel signal $S_{Im}$ and the Q-channel signal $S_{Qm}$ are respectively input to the image rejection units 311a and 311b through the pass B1. Then, the signals without image are respectively input to the lowpass filters 312a and 312b. The filtered signals are respectively input to the programmable gain amplifiers 314a and 314b to generate a pair of amplified signals. Through the path B2, the amplified signals are input to a secondary downconverter 318. The secondary downconverter 318 converts the amplified signals to a pair of baseband signals $S_{IO}$ and $S_{QO}$ output. The output signals are usually input to a digital signal processor (not shown in FIG. 3c).

The secondary downconverter 318 may be implemented with an analog circuit or a digital circuit. If the secondary downconverter 318 is implemented with the analog circuit, an analog-to-digital converter (not shown in FIG. 3c) must be coupled after the secondary downconverter 318. If the secondary downconverter 318 is implemented with the digital circuit, an analog-to-digital converter (not shown in FIG. 3c) must be coupled between the secondary downconverter 318 and the programmable gain amplifiers 314a and 314b.

To distinguish between the present invention and the prior art, the following illustrates one example of the conventional low-IF receiver and the first embodiment of the dual-mode receiver.

Figure 1:
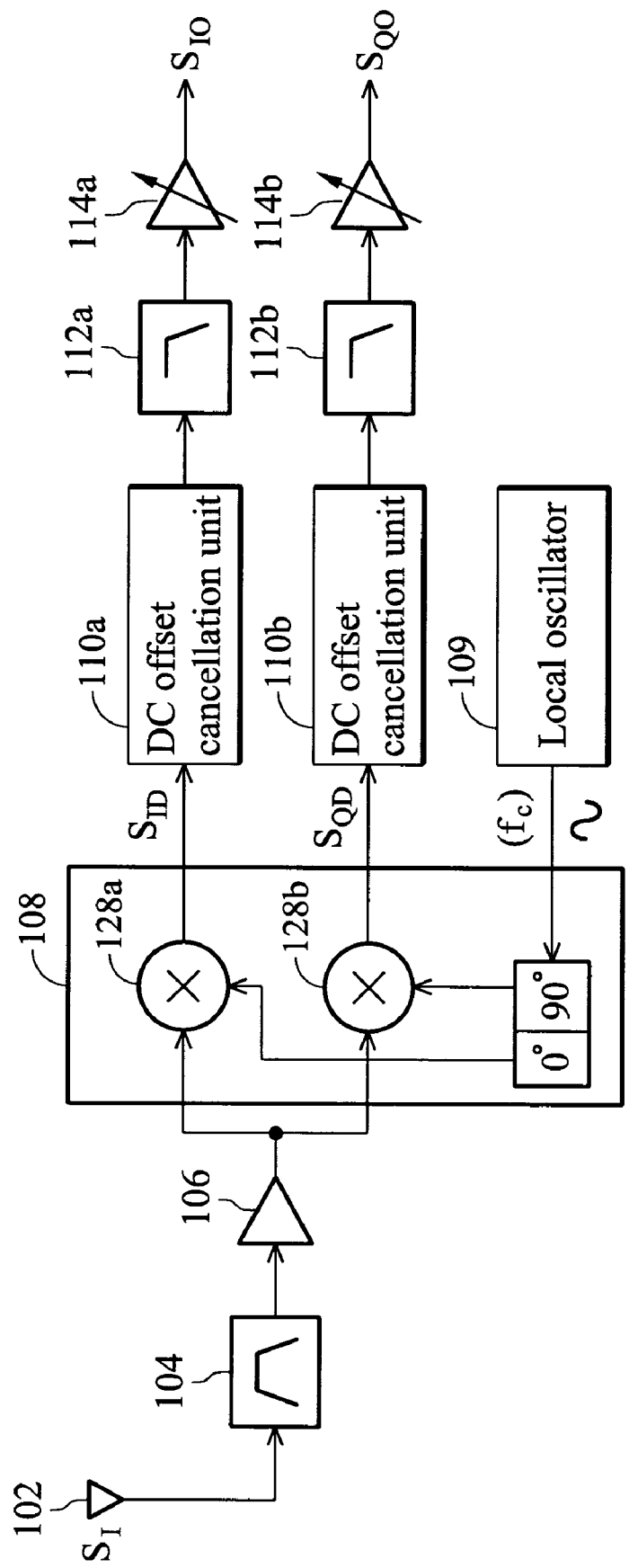
FIG. 1 is a diagram illustrating the configuration of the direct-conversion receiver in the prior art.
Figure 2:
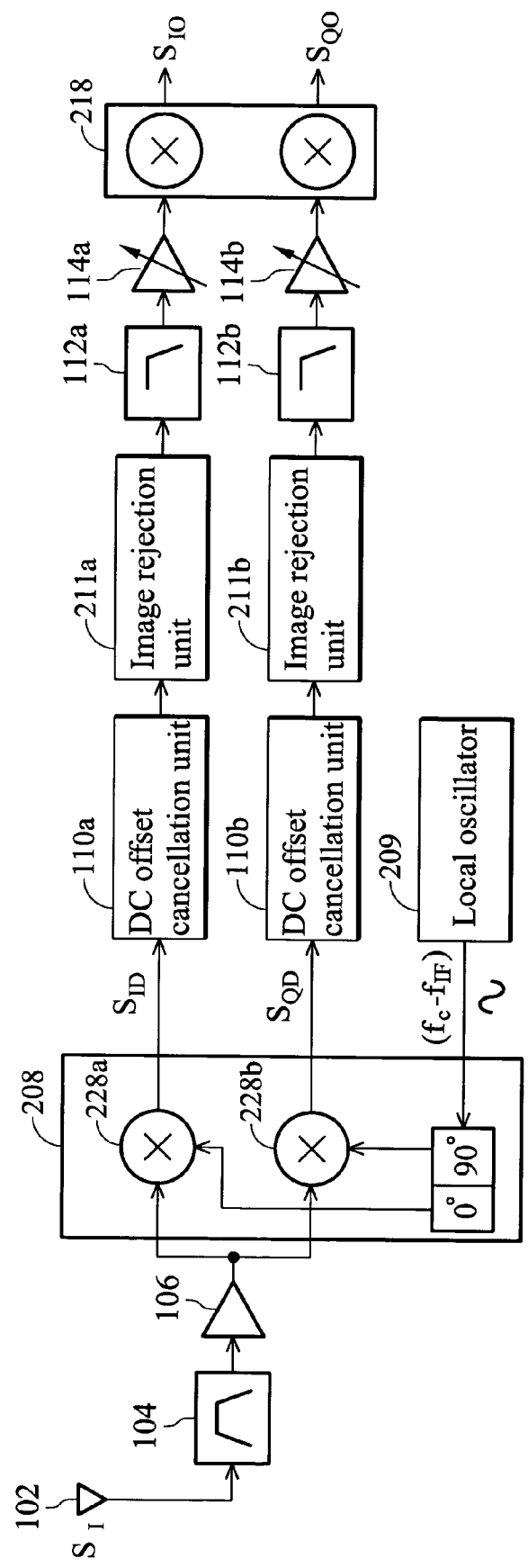
FIG. 2 is a diagram illustrating the configuration of the low-IF receiver in the prior art.
Figure 4:
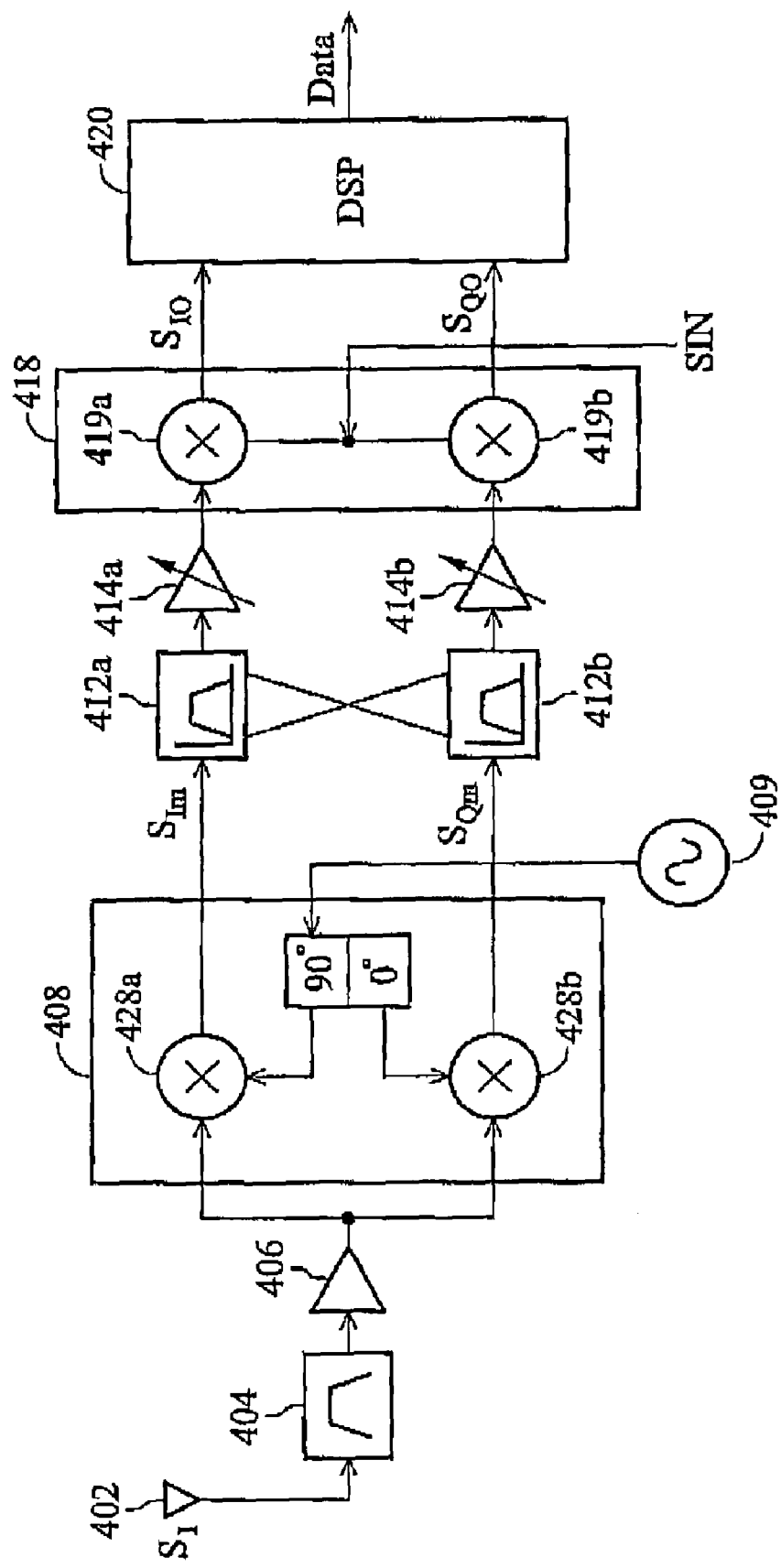
FIG. 4 is a diagram illustrating one example of the conventional low-IF receiver.

FIG. 4 is a diagram illustrating one example of the conventional low-IF receiver. As shown in FIG. 4, the low-IF receiver comprises an antenna 402, a bandpass filter 404, a low noise amplifier 406, a quadrature mixer 408, a pair of poly-phase filters 412a and 412b, a pair of programmable gain amplifiers 414a and 414b, a secondary downconverter 418 and a digital signal processor 420. The poly-phase filters 412a and 412b combine the functions of the DC offset cancellation units 110a and 110b, the lowpass filters 112a and 112b, and the image rejection units 211a and 211b shown in FIG. 2.

The signal $S_I$ is received by the antenna 402. The frequency of the carrier of the signal $S_I$ is $f_c$. After passing the bandpass filter 404, the signal $S_I$ is amplified by the low noise amplifier 406. The quadrature mixer 408 converts the amplified signal down to a pair of intermediate frequency signals with the carrier whose frequency is $f_{IF}$ ($f_{IF}$ is usually half the channel bandwidth but is not limited thereto). The intermediate frequency signals are respectively an I-channel signal $S_{Im}$ and a Q-channel signal $S_{Qm}$. The mixer 428a of the quadrature mixer 408 receives a sine signal whose frequency is $f_c$-$f_{IF}$ and whose phase is 0° from a local oscillator 409. The mixer 428b of the quadrature mixer 408 receives a sine signal whose frequency is $f_c$-$f_{IF}$ and whose phase is 90° from the local oscillator 409.

Then, the I-channel signal $S_{Im}$ and the Q-channel signal $S_{Qm}$ are respectively input to the poly-phase filters 412a and 412b to cancel image rejection. The signals without image are respectively input to the programmable gain amplifiers 414a and 414b to generate a pair of amplified signals. The amplified signals are input to the secondary downconverter 418. The secondary downconverter 418 converts the amplified signals to a pair of baseband signals $S_{IO}$ and $S_{QO}$ output. Multiplyers 419a and 419b of the secondary downconverter 418 respectively receive a sine signal whose frequency is $f_{IF}$ from another local oscillator (not shown in FIG. 4). The secondary downconverter 418 may be implemented with an analog circuit or a digital circuit. If the secondary downconverter 418 is implemented with the analog circuit, an analog-to-digital converter (not shown in FIG. 4) must be coupled after the secondary downconverter 418. If the secondary downconverter 418 is implemented with the digital circuit, an analog-to-digital converter (not shown in FIG. 4) must be coupled between the secondary downconverter 418 and the programmable gain amplifiers 414a and 414b. Finally, the digital signal processor 420 receives the baseband signals $S_{IO}$ and $S_{QO}$ to generate data information output.

Figure 5:
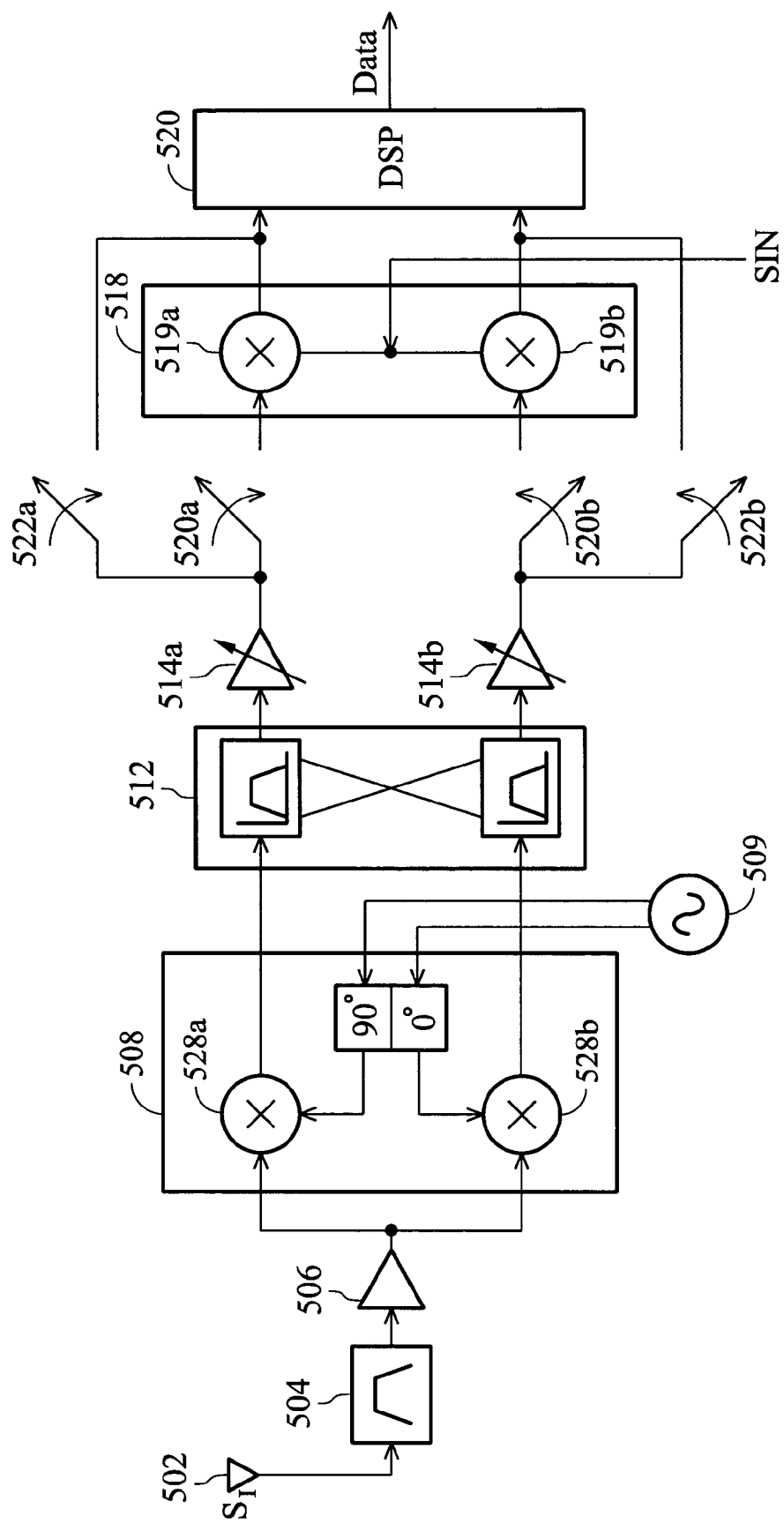
FIG. 5 is a diagram illustrating the configuration of the dual-mode receiver according to the first embodiment of the present invention.

FIG. 5 is a diagram illustrating the configuration of the dual-mode receiver according to the first embodiment of the present invention. Based on the low-IF receiver shown in FIG. 4, one dual-mode receiver show in FIG. 5 can be designed. As shown in FIG. 5, the dual-mode receiver comprises an antenna 502, a bandpass filter 504, a low noise amplifier 506, a quadrature mixer 508, a pair of dual-mode filters 512a and 512b, a pair of programmable gain amplifiers 514a and 514b, a secondary downconverter 518, a digital signal processor 520 and switches 520a, 520b, 522a and 522b. The dual-mode filters 512 combine the functions of the DC offset cancellation units 310a and 310b, the lowpass filters 312a and 312b, and the image rejection units 311a and 311b shown in FIG. 3.

A signal $S_I$ received by the antenna 502 through the bandpass filter 504 is a wideband signal such as WCDMA signal or a narrowband signal such as GSM signal. When the signal $S_I$ is the wideband signal, the dual-mode receiver enters the direct-conversion mode. The switchs 522a and 522b turn on. The signals output from the programmable gain amplifiers 514a and 514b are input to the digital signal processor 520 directly. A mixer 528a of the quadrature mixer 508 receives a sine signal whose frequency is $f_c$ and whose phase is 0° from the local oscillator 509. A mixer 528b of the quadrature mixer 508 receives a sine signal whose frequency is $f_c$ and whose phase is 90° from the local oscillator 509. When the signal $S_I$ is the narrowband signal, the dual-mode receiver enters the low-IF mode. The switchs 520a and 520b turn on. The signals output from the programmable gain amplifiers 514a and 514b are converted down to baseband signals in the secondary downconverter 518. Then, the baseband signals are input to the digital signal processor 520. The mixer 528a of the quadrature mixer 508 receives a sine signal whose frequency is $f_c$-$f_{IF}$ and whose phase is 0° from the local oscillator 509. The mixer 528b of the quadrature mixer 508 receives a sine signal whose frequency is $f_c$-$f_{IF}$ and whose phase is 90° from the local oscillator 509. Multipliers 519a and 519b of the secondary downconverter 518 respectively receive a sine signal $S_{IN}$ whose frequency is $f_{IF}$ from another local oscillator (not shown in FIG. 5).

After passing the bandpass filter 504, the signal $S_I$ is amplified by the low noise amplifier 506. When the dual-mode receiver operates in the direct-conversion mode, the quadrature mixer 508 converts the amplified signal down to a pair of baseband signals. When the dual-mode receiver operates in the low-IF mode, the quadrature mixer 508 converts the amplified signal down to a pair of intermediate frequency signals with the carrier whose frequency is $f_{IF}$. The signals output from the quadrature mixer 508 are input to the dual-mode filter 512. When the dual-mode receiver operates in the direct-conversion mode, the dual-mode filter 512 is configured as a lowpass filter to cancel interference. When the dual-mode receiver operates in the low-IF mode, the dual-mode filter 512 is configured as a poly-phase filter to cancel image. The programmable gain amplifiers 514a and 514b decrease the dynamic range of the signals output from the dual-mode filter 512. When the dual-mode receiver operates in the low-IF mode, the signals output from the programmable gain amplifiers 514a and 514b are converted down to baseband signals in the secondary downconverter 518. Then, the baseband signals are input to the digital signal processor 520. When the dual-mode receiver operates in the direct-conversion mode, the signals output from the programmable gain amplifiers 514a and 514b are directly input to the digital signal processor 520.

The secondary downconverter 518 may be implemented with an analog circuit or a digital circuit. If the secondary downconverter 518 is implemented with the analog circuit, an analog-to-digital converter (not shown in FIG. 5) must be coupled after the secondary downconverter 518. If the secondary downconverter 518 is implemented with the digital circuit, an analog-to-digital converter (not shown in FIG. 5) must be coupled between the secondary downconverter 518 and the programmable gain amplifiers 514a and 514b.

In this embodiment, the dual-mode filter is coupled before the programmable gain amplifiers. In other embodiments, the location of the dual-mode filter and the programmable gain amplifiers may be changed. Both the dual-mode filter and the programmable gain amplifier can be divided as several stages and interleaved as well.

To distinguish between the present invention and the prior art, the following illustrates another example of the conventional low-IF receiver and the second embodiment of the dual-mode receiver.

Figure 6:
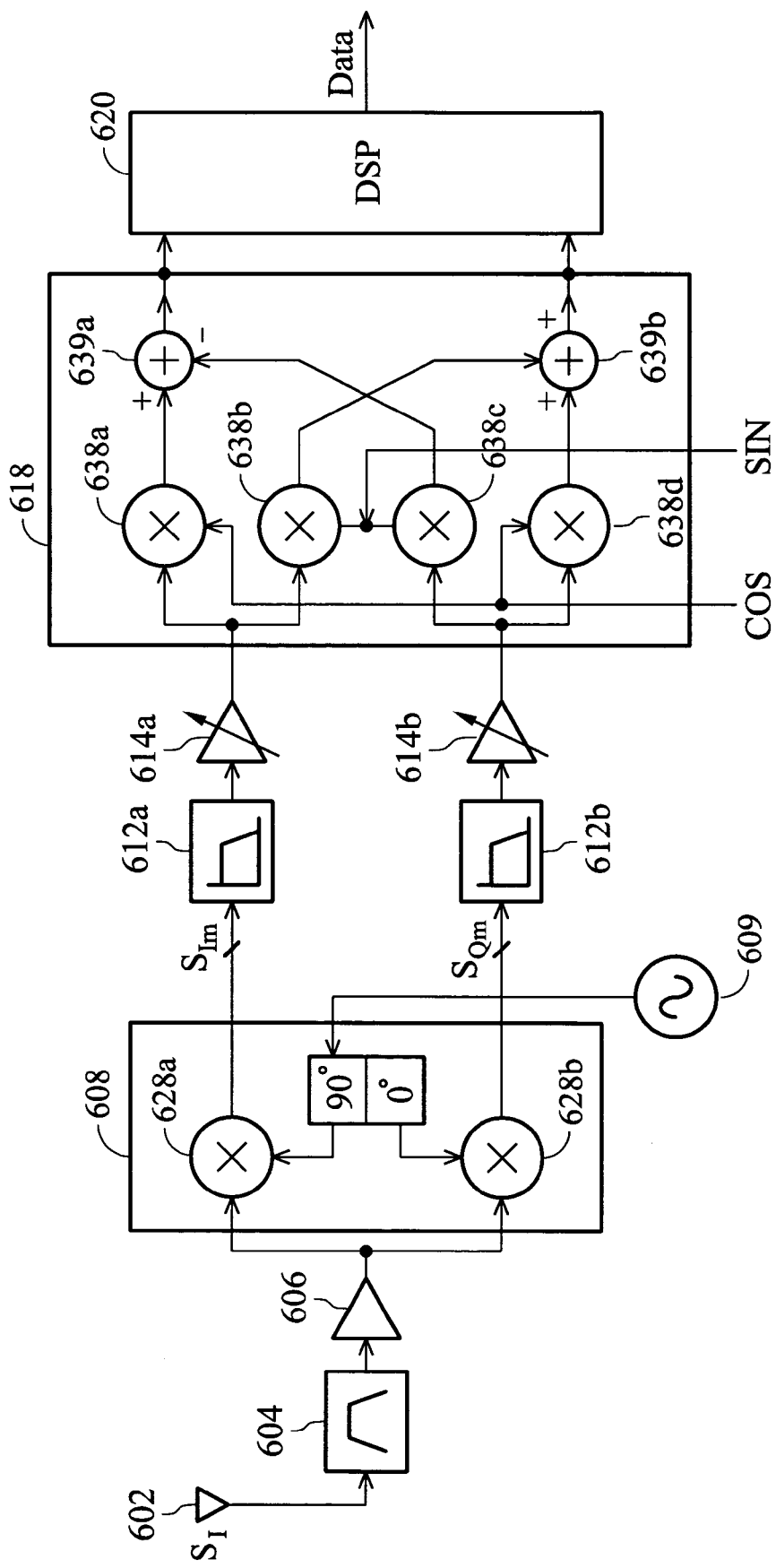
FIG. 6 is a diagram illustrating another example of the conventional low-IF receiver.

FIG. 6 is a diagram illustrating another example of the conventional low-IF receiver. As shown in FIG. 6, the low-IF receiver comprises an antenna 602, a bandpass filter 604, a low noise amplifier 606, a quadrature mixer 608, a pair of lowpass filters 612a and 612b, a pair of programmable gain amplifiers 614a and 614b, a quadrature secondary downconverter 618 and a digital signal processor 620. The low-IF receiver shown in FIG. 6 is almost the same as the low-IF receiver shown in FIG. 4. The major difference is that the quadrature secondary downconverter 618 not only converts the I-channel intermediate frequency signal and the Q-channel intermediate frequency signal to a pair of baseband signals $S_{IO}$ and $S_{QO}$ but also cancels image. Thus, the poly-phase filters 412a and 412b shown in FIG. 4 are no longer used to cancel image. In FIG. 6, the lowpass filters 612a and 612b are used instead of the poly-phase filters 412a and 412b. In other words, the quadrature secondary downconverter 618 combines the functions of the secondary downconverter 218 and the image rejection units 211a and 211b shown in FIG. 2. The lowpass filters 612a and 612b involve the function of the DC offset cancellation units 110a and 110b shown in FIG. 2.

Signals output from the programmable gain amplifiers 514a and 514b are input to the quadrature secondary downconverter 618. Using multipliers 638a~638d, the input signals are multiplied by a sine signal SIN and a cosine signal COS. Signals multiplied by the sine signal SIN are added by an adder 639a. Signals multiplied by the sine signal COS are added by an adder 639b. Then, signals output from the adders 639a and 639b are input to the digital signal processor 620. The detailed illustration of the low-IF receiver refers to "Low-IF topologies for high-performance analog front ends of fully integrated receivers", J. Crols, M. Steyaert, IEEE Transactions on Circuits and Systems-II Analog and digital signal processing, vol. 45, no. 3, pp. 269-282, March 1998.

Figure 7:
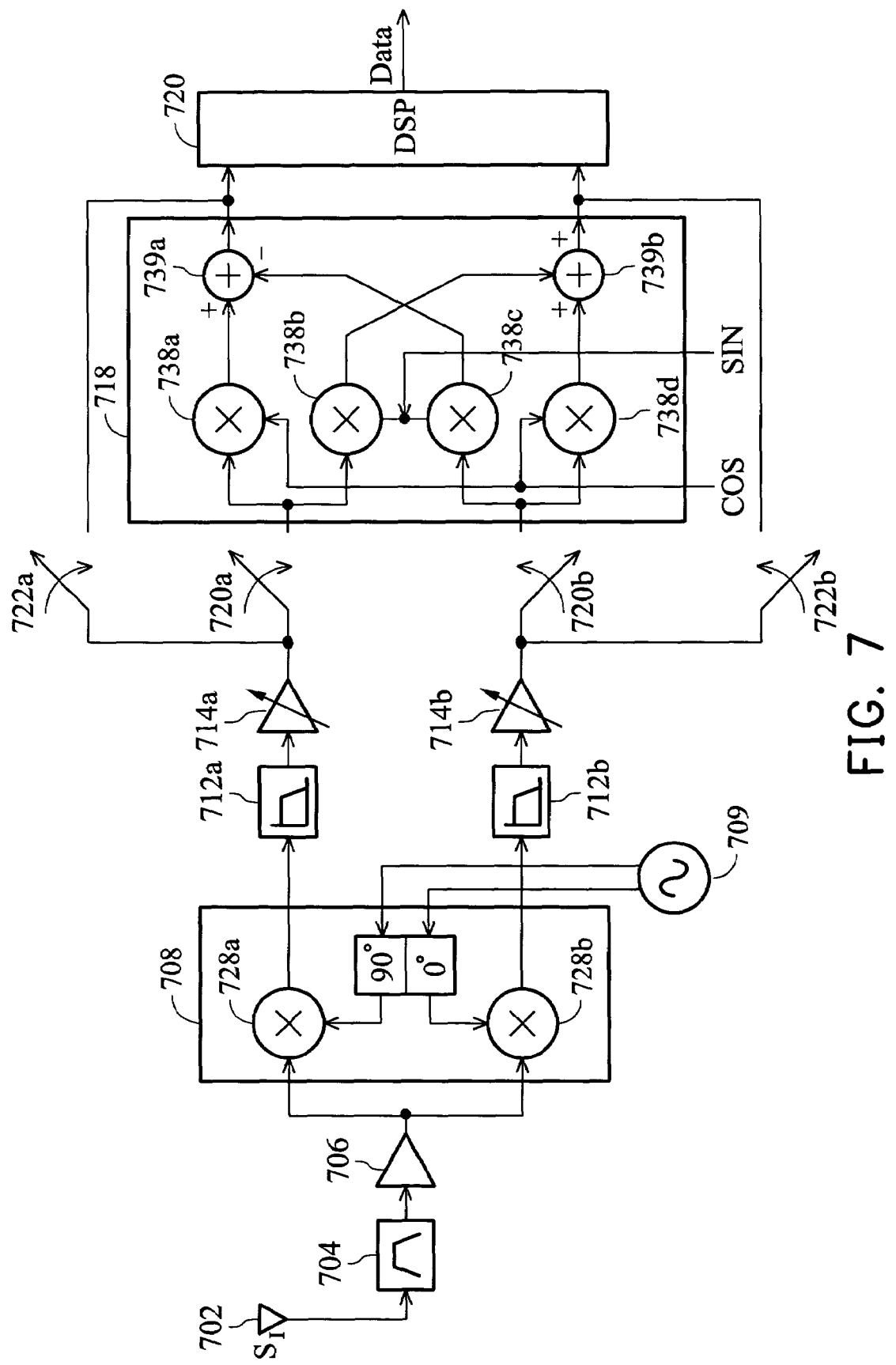
FIG. 7 is a diagram illustrating the configuration of the dual-mode receiver according to the second embodiment of the present invention.

FIG. 6 is a diagram illustrating the configuration of the dual-mode receiver according to the second embodiment of the present invention. Based on the low-IF receiver shown in FIG. 6, one dual-mode receiver shown in FIG. 7 can be designed. As shown in FIG. 7, the dual-mode receiver comprises an antenna 702, a bandpass filter 704, a low noise amplifier 706, a quadrature mixer 708, a pair of lowpass filters 712a and 712b, a pair of programmable gain amplifiers 714a and 714b, a quadrature secondary downconverter 718, a digital signal processor 720 and switchs 720a, 720b, 722a and 722b. The quadrature secondary downconverter 718 combines the functions of the secondary downconverter 318 and the image rejection units 311a and 311b shown in FIG. 3. The lowpass filters 712a and 712b combine the function of the DC offset cancellation units 310a and 310b, and the lowpass filters 312a and 312b shown in FIG. 3.

A signal $S_I$ received by the antenna 702 through the bandpass filter 704 is a wideband signal such as WCDMA signal or a narrowband signal such as GSM signal. When the signal $S_I$ is the wideband signal, the dual-mode receiver enters the direct-conversion mode. The switchs 722a and 722b turn on. The signals output from the programmable gain amplifiers 714a and 714b are input to the digital signal processor 720 directly. A mixer 728a of the quadrature mixer 708 receives a sine signal whose frequency is $f_c$ and whose phase is 0° from the local oscillator 709. A mixer 728b of the quadrature mixer 708 receives a sine signal whose frequency is $f_c$ and whose phase is 90° from the local oscillator 709. When the signal $S_I$ is the narrowband signal, the dual-mode receiver enters the low-IF mode. The switchs 720a and 720b turn on. The signals output from the programmable gain amplifiers 714a and 714b are converted down to baseband signals in the quadrature secondary downconverter 718. Then, the baseband signals are input to the digital signal processor 720. The mixer 728a of the quadrature mixer 708 receives a sine signal whose frequency is $f_c-f_{IF}$ and whose phase is 0° from the local oscillator 709. The mixer 728b of the quadrature mixer 708 receives a sine signal whose frequency is $f_c-f_{IF}$ and whose phase is 90° from the local oscillator 709. Multipliers 738a and 738d of the quadrature secondary downconverter 718 receive a cosine signal COS whose frequency is $f_{IF}$ from another local oscillator (not shown in FIG. 7). Multipliers 738b and 738c of the quadrature secondary downconverter 718 receive a sine signal SIN whose frequency is $f_{IF}$ from another local oscillator (not shown in FIG. 7).

After passing the bandpass filter 704, the signal $S_I$ is amplified by the low noise amplifier 706. When the dual-mode receiver operates in the direct-conversion mode, the quadrature mixer 708 converts the amplified signal down to a pair of baseband signals. When the dual-mode receiver operates in the low-IF mode, the quadrature mixer 708 converts the amplified signal down to a pair of intermediate frequency signals with the carrier whose frequency is $f_{IF}$. The signals output from the quadrature mixer 708 are respectively input to the lowpass filters 712a and 712b. The programmable gain amplifiers 714a and 714b decrease the dynamic range of the signals output from the lowpass filters 712a and 712b. When the dual-mode receiver operates in the low-IF mode, the signals output from the programmable gain amplifiers 714a and 714b are converted down to baseband signals in the quadrature secondary downconverter 718. Then, the baseband signals are input to the digital signal processor 720. When the dual-mode receiver operates in the direct-conversion mode, the signals output from the programmable gain amplifiers 714a and 714b are directly input to the digital signal processor 720.

The quadrature secondary downconverter 718 may be implemented with an analog circuit or a digital circuit. If the quadrature secondary downconverter 718 is implemented with the analog circuit, an analog-to-digital converter (not shown in FIG. 7) must be coupled after the quadrature secondary downconverter 718. If the quadrature secondary downconverter 718 is implemented with the digital circuit, an analog-to-digital converter (not shown in FIG. 7) must be coupled between the quadrature secondary downconverter 718 and the programmable gain amplifiers 714a and 714b.

In this embodiment, the lowpass filters are coupled before the programmable gain amplifiers. In other embodiments, the location of the lowpass filters and the programmable gain amplifiers may be changed. Both the lowpass filter and the programmable gain amplifier can be divided as several stages and interleaved as well.

The advantage of the present invention is provision of a dual-mode receiver to receive both narrowband signals and wideband signals with high quality and satisfy the requirement for various systems whose adjacent channels have various power. The receiver combines a direct-conversion mode and a low-IF mode and common elements between the two modes in the receiver are shared. Thus, the hardware cost and the superficial measure of the chip comprising the dual-mode receiver are significantly decreased.

While the invention has been described by way of example and in terms of the preferred embodiments, it is to be understood that the invention is not limited to the disclosed embodiments. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A dual-mode receiver, comprising:
   an antenna for receiving an input signal with a carrier from a transmitting channel;
   a low noise amplifier coupled to the antenna, for amplifying the input signal;
   a quadrature mixer coupled to the low noise amplifier, for receiving an amplified signal and two local oscillator signals respectively with a first phase and a second phase, wherein when the dual-mode receiver operates in a direct-conversion mode, the quadrature mixer converts the amplified signal down to a pair of first baseband signals and when the dual-mode receiver operates in a low-IF mode, the quadrature mixer converts the amplified signal down to a pair of second intermediate frequency signals with the carrier whose frequency is a first frequency;
   a pair of dual-mode filters coupled to the mixer, wherein when the dual-mode receiver operates in the direct-conversion mode, the dual-modes filters are a pair of low pass filters and when the dual-mode receiver operates in the low-IF mode, the dual-modes filters are a pair of poly-phase filters;
   a pair of programmable gain amplifiers respectively coupled to the dual-mode filters, wherein when the dual-mode receiver operates in the direct-conversion mode, the programmable gain amplifiers receive first baseband signals to generate a pair of first signals output and when the dual-mode receiver operates in the low-IF mode, the programmable gain amplifiers receive the second intermediate frequency signal signals to generate a pair of second signals output;
   a secondary downconverter, wherein when the dual-mode receiver operates in the low-IF mode, the secondary downconverter receives the second signals and a second local oscillator signal, and converts the second signals to a pair of third baseband signals output; and
   a pair of switching elements for connecting the programmable gain amplifiers to the secondary downconverter when the dual-mode receiver operates in the low-IF mode.

2. The dual-mode receiver of claim 1, wherein the dual-mode receiver further comprises:
   a local oscillator for generating a local oscillator signal with the first phase, a local oscillator signal with the second phase and a second local oscillator signal;
   a digital signal processor, wherein when the dual-mode receiver operates in the direct-conversion mode, the digital signal processor receives the first signals to generate data information output and when the dual-mode receiver operates in the low-IF mode, the digital signal processor receives the third signals to generate data information output; and
   a pair of switching elements for connecting the programmable gain amplifiers to the digital signal processor when the dual-mode receiver operates in the direct-conversion mode.

3. The dual-mode receiver of claim 1, wherein the first phase and the second phase are respectively 90° and 0°.

4. The dual-mode receiver of claim 1, wherein the secondary downconverter is implemented with an analog circuit.

5. The dual-mode receiver of claim 4, further comprising an analog-to-digital converter coupled after the secondary downconverter.

6. The dual-mode receiver of claim 1, wherein the secondary downconverter is implemented with a digital circuit.

7. The dual-mode receiver of claim 6, further comprising an analog-to-digital converter coupled between the secondary downconverter and the programmable gain amplifiers.

8. A dual-mode receiver, comprising:
an antenna for receiving an input signal with a carrier from a transmitting channel;
a low noise amplifier coupled to the antenna, for amplifying the input signal;
a quadrature mixer coupled to the low noise amplifier, for receiving an amplified signal and two local oscillator signals respectively with a first phase and a second phase, wherein when the dual-mode receiver operates in a direct-conversion mode, the quadrature mixer converts the amplified signal down to a pair of first baseband signals and when the dual-mode receiver operates in a low-IF mode, the quadrature mixer converts the amplified signal down to a pair of second intermediate frequency signals with the carrier whose frequency is a first frequency;
a pair of low pass filters coupled to the mixer, wherein when the dual-mode receiver operates in the direct-conversion mode, the low pass filters receive the first baseband signals and when the dual-mode receiver operates in the low-IF mode, the low pass filters receive the second intermediate frequency signals;
a pair of programmable gain amplifiers respectively coupled to the dual-mode filters, wherein when the dual-mode receiver operates in the direct-conversion mode, the programmable gain amplifiers receive first baseband signals to generate a pair of first signals output and when the dual-mode receiver operates in the low-IF mode, the programmable gain amplifiers receive the second intermediate frequency signal signals to generate a pair of second signals output;
a quadrature secondary downconverter, wherein when the dual-mode receiver operates in the low-IF mode, the secondary downconverter receives the second signals and two second local oscillator signals respectively in the first phase and the second phase, and converts the second signals to a pair of third baseband signals output; and
a pair of switching elements for connecting the programmable gain amplifiers to the quadrature secondary downconverter when the dual-mode receiver operates in the low-IF mode.

9. The dual-mode receiver of claim 8, wherein the dual-mode receiver further comprises:
a local oscillator for generating the local oscillator signal with the first phase, the local oscillator signal with the second phase, the second local oscillator signal with the first phase and the second local oscillator signal with the second phase;
a digital signal processor, wherein when the dual-mode receiver operates in the direct-conversion mode, the digital signal processor receives the first signals to generate data information output and when the dual-mode receiver operates in the low-IF mode, the digital signal processor receives the third signals to generate data information output; and
a pair of switching elements for connecting the programmable gain amplifiers to the digital signal processor when the dual-mode receiver operates in the direct-conversion mode.

10. The dual-mode receiver of claim 8, wherein the first phase and the second phase are respectively 90° and 0°.

11. The dual-mode receiver of claim 8, wherein the quadrature secondary downconverter is implemented with an analog circuit.

12. The dual-mode receiver of claim 11, further comprising an analog-to-digital converter coupled after the quadrature secondary downconverter.

13. The dual-mode receiver of claim 8, wherein the quadrature secondary downconverter is implemented with a digital circuit.

14. The dual-mode receiver of claim 13, further comprising an analog-to-digital converter coupled between the quadrature secondary downconverter and the programmable gain amplifiers.

* * * * *